June 29, 1965  W. G. GREEN  3,191,713
SURVEY APPARATUS
Filed Oct. 5, 1962
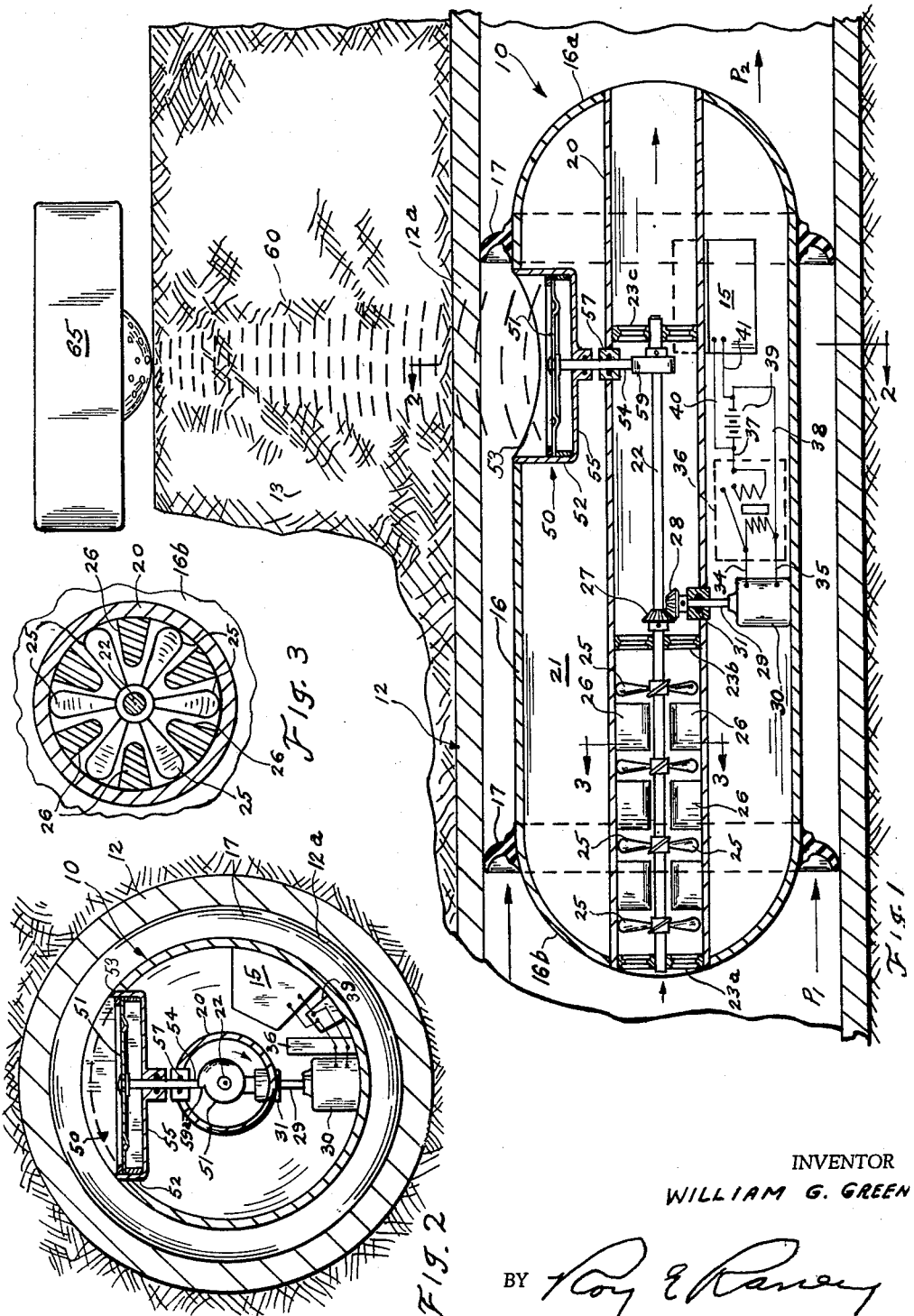
INVENTOR
WILLIAM G. GREEN
BY
ATTORNEY 3,191,713
SURVEY APPARATUS
William G. Green, St. Petersburg, Fla., assignor to Aquatron Engineering Corp., St. Petersburg, Fla., a corporation of Florida
Filed Oct. 5, 1962, Ser. No. 228,714
6 Claims. (Cl. 181—.5)

This invention relates to pipeline survey apparatus of the type which is moved through underground metal pipelines carrying oil or the like for detecting areas of corrosion or possible corrosion and failure due to electrical currents, salt water accumulations, etc. As such the invention is related to the invention disclosed in United States Patent No. 3,064,127.

More particularly, this invention is directed to improvements relating to the generation of electric power for operating condition detecting instrumentations which form part of a survey apparatus such as disclosed in the copending application. In addition the invention is directed to improved means for generating sounds, useful in tracing the travel of the survey apparatus through a pipeline.

Accordingly, it is one important object of this invention to provide, in an improved pipeline survey apparatus which carries condition detecting instrumentation and is propelled through the pipeline by fluid moving under pressure therein, an electric current generating means operated by fluid flow through the apparatus from a high pressure zone at one end of the apparatus to a lower pressure zone at the other end thereof.

Another important object of this invention is the provision of an improved pipeline survey apparatus comprising a fluid pressure operated sounding means for giving off sound signals which provide a readily detected indication of the progress of the apparatus as it travels along a pipeline under the influence of fluid moving under pressures therein, and aids in locating the apparatus if its progress is interrupted by a partial obstruction or the like.

As another object this invention aims to provide an improved pipeline survey apparatus of the character described in the foregoing paragraphs and wherein the electric current generating means and the sounding means are operated simultaneously by the flow of fluid under pressure through the apparatus. In one preferred form of the invention the foregoing objects are accomplished by providing a passageway for conducting pressure fluid from one end of the apparatus to the other and including turbine means operated by the passing fluid to impart rotation to a drive shaft connected to an electric current generator and to a sound impulse generating device.

Other objects and advantages of pipeline survey apparatus embodying this invention will become apparent from the following detailed description of a presently preferred form thereof, read in conjunction with the accompanying sheets of drawings, in which:

FIG. 1 is a longitudinal sectional view of a pipeline surveying apparatus embodying this invention illustrated in association with an underground pipeline;

FIG. 2 is a transverse sectional view of the apparatus of FIG. 1 taken substantially along line 2—2 thereof.

FIG. 3 is a fragmentary sectional view taken along line 3—3 of FIG. 1.

In the form of the invention illustrated in the drawings and described hereinafter, there is provided a pipeline survey apparatus, generally indicated at 10, which is adapted to travel along the bore of a buried pipeline 12.

The apparatus 10 contains instrumentations for determining various pipeline conditions such as the presence of electrical currents in the walls of the pipeline, accumulations of salt water in the pipeline, and pitting and corrosion of the pipeline walls. The instrumentations per se form no part of the present invention and are indicated collectively by the reference numeral 15. Detailed descriptions of the instrumentations may be had by reference to the aforementioned patent. Suffice it to say that these instrumentations require a source of elecric current for the operation of various components thereof such as magnetic flux pick-up means, recording ammeter means, photoelectric sensing circuits, and the like.

The present invention provides means, described more fully as the specification proceeds, for deriving such an electric current supply from the flow of oil or other fluid which is pumped under pressure through the pipeline 12. The apparatus 10 comprises a generally cylindrical, hollow capsule 16 having hemispherical front and rear end portions 16a and 16b, respectively. The capsule 16 is conveniently formed of a relatively non-magnetic material such as stainless steel, and has an outside diameter somewhat less than the inside diameter of the pipeline 12 through which it is to travel. A pair of flexible annular flanges 17 gird the capsule 16 and are in resilient sealing engagement about their peripheries with the inside wall surface 12a of the pipeline 12.

The apparatus 10 is adapted to be propelled along the interior of the pipe from the left to the right as viewed in FIG. 1 by the force of a fluid such as oil which is pumped through the pipe under pressure and acts against the apparatus and flanges 17 thereof as a piston. It will be recognized that if a pressure $P_1$ is maintained in the pipeline to the left of the apparatus while a lesser pressure $P_2$ is maintained to the right of the apparatus, the apparaus will end to move along the pipeline with the pressure fluid.

The apparatus 10 comprises an axially extending tube 20 which defines a fluid flow passage through the apparatus from the higher pressure zone $P_1$ at one end thereof to the lower pressure zine $P_2$ at the other end thereof. A fluid-tight, annular chamber 21 is thereby formed within the capsule 16 for housing the instrumentations 15 as well as other components described hereinafter.

The resulting flow of pressure fluid through the tube 20 is utilized to drive a turbine means comprising a shaft 22 rotatably journaled in suitable bearing spiders 23a, 23b, and 23c. Mounted on the shaft 22 are a plurality of rotary turbine blades 25 which are adapted to be rotated by the flow of fluid from pressure $P_1$ to pressure $P_2$ through the tube 20. A plurality of stationary turbine blades 26 are mounted in the tube 20 adjacent the blades 25 to assist the turbine action thereof.

The shaft 22, which is rotated by the turbine blades 25, has secured thereto for rotation therewith a bevel gear 27 which is in engagement with a bevel gear 28 mounted on the shaft 29 of an electric current generator 30. The generator 30 is disposed in the annular, fluid-tight chamber 21 with the shaft 29 thereof extending through a suitable seal 31 in the wall of tube 20. It will be recognized that the generator 30 derives its motive power from the flow of pressure fluid passing through the tube 20 and acting against the turbine blades 25.

The generator 30 may provide an output of either A.C. or D.C. in accordance with the requirements of the instrumentations 15. In the present example, however, generator 30 is a D.C. generator and is connected by lines 34 and 35 to a reverse current cut-out relay 36 which is connected in turn by wires 37 and 38 to a suitable storage battery 39. The storage battery is connected by wires 40 and 41 to the instrumentation 15 which is thereby supplied with suitable power for determining the various pipeline conditions. Of course, if the instrumentation means require alternating current, the generator 30 may be an A.C. generator connected directly to the instrumentation means and may be provided with suitable rectifying means for rectifying a portion of the alternating current output for charging the storage battery and/or directly operating direct current instrumentations.

In order to trace the movement of the apparatus 10 through the underground pipeline 12, the apparatus is provided with means for deriving sound impulses from the pressure fluid coursing through the tube 20. To this end, there is provided a sounding means generally indicated at 50 and comprising a resiliently flexible diaphragm 51, the periphery of which is secured in a cylindrical or cup-shaped member 52 recessed into an opening 53 in the side wall of the capsule 16. An operating rod 54 is connected at one end to the center of the diaphragm 51 and extends through suitable sealing means in the bottom wall 55 of cup 52 and through suitable sealing means 57 in the axially extending tube 20. The other end of rod 54 is engaged by a cam wheel 59 which is secured to the rotatable shaft 22 for rotation therewith. The periphery of the cam wheel 59 is characterized by a gradually increasing radius which provides a rise terminating in an abrupt shoulder 59a.

As the pressure fluid flows through the tube 20 and rotates the turbine blade 25 and shaft 22, the cam wheel 59 is rotated causing the shaft 54 to be gradually displaced until it drops from the cam shoulder 59a and causes a rapid fluctuation in the diaphragm 51 for emitting sound waves 60 through the fluid medium in the pipeline. The sound waves 60 travel through the walls 12a of the pipeline, through the ground 13, and are adapted to be detected by a sound pick-up means 65 at the surface of the ground. The sound pick-up means 65 is preferably portable so that the travel of the apparatus 10 through the pipeline 12 may be readily tracked. Alternatively, a plurality of sound pick-up means 65 may be located at spaced stations along the pipeline to detect and/or record the passing of the apparatus 10.

While the wheel 59 is described as having but a single shoulder 59a, it will be understood that the wheel may be provided with a plurality of shoulders or "teeth" if a higher frequency of sound impulses is desired. Also, other sounding means than the diaphragm and rod may be resiliently biased against the wheel 59 so as to produce desired sound impulses upon rotation of the wheel.

From the foregoing detailed description of an improved pipeline survey apparatus 10 embodying this invention, it will be appreciated that there has been provided thereby an improved means for supplying pipeline condition detecting instrumentations with suitable electric power while traversing a pipeline bore, the power being derived from the fluid pressure of the fluid being pumped through the pipeline. It will also be appreciated that the invention has provided an improved pipeline survey apparatus which simultaneously generates electric power for its instrumentation and sound signals by which the apparatus may be effectively tracked in its travels through the pipeline bore. Of course, it will be recognized that the invention may be embodied in other forms without departing from the spirit of the invention.

Accordingly, although the invention is described in considerable detail with reference to a specific pipeline survey apparatus embodying the invention, it will be understood that the invention is not limited thereto, but rather the invention includes all those modifications, adaptations, substitutions, and uses as are reasonably embraced by the scope of the claims hereof.

Having thus described my invention, I claim:

1. A pipeline survey apparatus for traveling through a horizontally extending fluid pipeline, said apparatus comprising:
   (a) a hollow body,
   (b) instrumentation in said body,
   (c) sealing means to support said body in fluid-tight relation with the walls of said pipeline, and
   (d) fluid pressure operated means within said body to generate electric power for operation of said instrumentation.

2. A pipeline survey apparatus for carrying condition detecting instrumentation through a horizontally extending pipeline bore, said apparatus comprising:
   (a) an instrument carrying capsule adapted to be propelled through said pipeline by fluid pressure,
   (b) said capsule having means defining a fluid flow passage through said capsule,
   (c) rotary turbine means mounted in said passage and operable by fluid flow therethrough, and
   (d) electric current generating means connected to said turbine means for operation thereby.

3. A pipeline survey apparatus for carrying condition detecting instrumentation through a horizontally extending pipeline bore, said apparatus comprising:
   (a) an instrumentation carrying capsule adapted to be propelled by fluid pressure through said pipeline bore,
   (b) annular sealing means for effecting a fluid-tight but sliding seal between said capsule and the wall of said pipeline,
   (c) said capsule having means defining a fluid flow passage therethrough, and
   (d) fluid pressure operated sound generating means mounted in said capsule, and operable by pressure fluid flow through said passage.

4. Apparatus as defined in claim 3 and wherein said sound generating means comprises a cam wheel having an abrupt shoulder on the periphery thereof, fluid pressure operated rotary means disposed in said passage and connected to said wheel to effect rotation thereof upon flow of said pressure fluid through said passage, and sounding means comprising an element resiliently biased against said wheel whereby upon rotation of said wheel said element will drop off said shoulder and said sound generating means will emit a sound impulse.

5. A pipeline survey apparatus for carrying condition detecting instrumentation through a horizontally extending pipeline bore, said apparatus comprising:
   (a) an instrument carrying capsule adapted to be propelled through said pipeline by fluid pressure,
   (b) said capsule having means defining a fluid flow passage through said capsule,
   (c) rotary turbine means mounted in said passage and operable by fluid flow therethrough,
   (d) electric current generating means connected to said turbine means for operation thereby, and
   (e) sound generating means carried by said capsule and operable to generate sound signals in response to fluid flow through said passage.

6. Apparatus as defined in claim 5 and wherein said sound generating means comprises a toothed wheel connected to said rotary turbine means for rotation thereby, diaphragm means resiliently biased toward said toothed wheel, and means between said wheel and diaphragm means for effecting vibratory movement of the latter in response to rotation of the former.

No references cited.

SAMUEL FEINBERG, *Primary Examiner.*

CHESTER L. JUSTUS, *Examiner.*